(12) United States Patent
Franceschini et al.

(10) Patent No.: US 10,394,829 B2
(45) Date of Patent: Aug. 27, 2019

(54) CONTENT AUTHORING

(71) Applicant: International Business Machines Corporation, Armonk, NY (US)

(72) Inventors: Michele M. Franceschini, White Plains, NY (US); Tin Kam Ho, Millburn, NJ (US); Luis A. Lastras-Montano, Cortlandt Manor, NY (US); Oded Shmueli, New York, NY (US); Livio Soares, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 14/962,456

(22) Filed: Dec. 8, 2015

(65) Prior Publication Data

US 2017/0161279 A1 Jun. 8, 2017

(51) Int. Cl.
*G06N 5/02* (2006.01)
*G06F 16/33* (2019.01)
*G06F 16/93* (2019.01)
*G06F 16/248* (2019.01)
*G06F 16/2457* (2019.01)

(52) U.S. Cl.
CPC ...... *G06F 16/24578* (2019.01); *G06F 16/248* (2019.01); *G06F 16/3347* (2019.01); *G06F 16/93* (2019.01); *G06N 5/02* (2013.01)

(58) Field of Classification Search
CPC ............... G06F 17/279; G06F 17/3053; G06F 17/30554; G06F 17/30011; G06F 16/24578; G06F 16/93; G06F 16/3347; G06F 16/248; G06N 5/02
USPC .......................................... 707/723, 732, 734
See application file for complete search history.

(56) References Cited

U.S. PATENT DOCUMENTS 6,112,186 A * 8/2000 Bergh .................... G06Q 30/02
                                                                705/7.32
8,260,664 B2 * 9/2012 Vadlamani ............. G06Q 30/02
                                                                705/14.49

(Continued)

OTHER PUBLICATIONS

R. High, "The Era of Cognitive Systems: An Inside Look at IBM Watson and How it Works," IBM Redbooks, 2012.

(Continued)

*Primary Examiner* — Phong H Nguyen
(74) *Attorney, Agent, or Firm* — Terrile, Cannatti & Chambers, LLP; Michael Rocco Cannatti

(57) ABSTRACT

A method and apparatus are provided for recommending concepts from a first concept set in response to user selection of a first concept Ci by performing a natural language processing (NLP) analysis comparison of vector representations of user concepts contained in written content authored by the user and candidate concepts in a first concept set to determine a similarity measure for each candidate concept, and to select therefrom one or more of the candidate concepts for display as recommended concepts which are related to the user concepts contained in written content authored by the user based on the similarity measure between each candidate concept and each user concept.

14 Claims, 4 Drawing Sheets

(56) References Cited

U.S. PATENT DOCUMENTS

| | | | |
|---|---|---|---|
| 9,798,818 | B2 | 10/2017 | Ho et al. |
| 2005/0108001 | A1 | 5/2005 | Aarskog |
| 2009/0150388 | A1 | 6/2009 | Roseman et al. |
| 2011/0196737 | A1* | 8/2011 | Vadlamani ............ G06Q 30/02 705/14.49 |
| 2011/0219012 | A1* | 9/2011 | Yih ....................... G06F 16/00 707/749 |
| 2011/0252342 | A1 | 10/2011 | Broman |
| 2012/0167010 | A1* | 6/2012 | Campbell ............ G06F 3/0482 715/825 |
| 2013/0246430 | A1 | 9/2013 | Szucs et al. |
| 2014/0172828 | A1 | 6/2014 | Mo et al. |
| 2015/0339573 | A1 | 11/2015 | Flinn et al. |
| 2016/0179945 | A1* | 6/2016 | Lastra Diaz .......... G06F 16/367 707/739 |
| 2016/0232160 | A1 | 8/2016 | Buhrmann et al. |
| 2017/0032273 | A1 | 2/2017 | Ho et al. |
| 2017/0132288 | A1 | 5/2017 | Ho et al. |
| 2017/0161619 | A1* | 6/2017 | Franceschini ......... G06N 5/022 |
| 2017/0262783 | A1 | 9/2017 | Franceschini et al. |
| 2017/0286835 | A1 | 10/2017 | Ho et al. |

OTHER PUBLICATIONS

Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Georgios Stratogiannis et al., "Related Entity Finding Using Semantic Clustering Based on Wikipedia Categories." In Language Processing and Intelligent Information Systems, pp. 157-170. Springer, Berlin, Heidelberg, 2013.

Xiaohua Hu et al., "Exploiting Wikipedia as external knowledge for document clustering." In Proceedings of the 15th ACM SIGKDD international conference on Knowledge discovery and data mining, pp. 389-396. ACM, 2009.

Qinghua Zheng et al., "A domain ontology-based navigation learning system." In Computer Supported Cooperative Work in Design, 2008. CSCWD 2008. 12th International Conference on, pp. 1065-1070. IEEE, 2008.

Patel Jay et al., "Review on web search personalization through semantic data." In Electrical, Computer and Communication Technologies (ICECCT), 2015 IEEE International Conference on, pp. 1-6. IEEE, 2015.

* cited by examiner

CONTENT AUTHORING

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). The QA system generates answers from an ingested knowledge base corpus, including publicly available information and/or proprietary information stored on one or more servers, Internet forums, message boards, or other online discussion sites. Using the ingested information, the QA system can formulate answers using artificial intelligence (AI) and natural language processing (NLP) techniques to provide answers with associated evidence and confidence measures. However, the quality of the answer depends on the ability of the QA system to identify and process information contained in the knowledge base corpus.

With some traditional QA systems, there are mechanisms provided for processing information in a knowledge base by using vectors to represent words to provide a distributed representation of the words in a language. Such mechanisms include "brute force" learning by various types of Neural Networks (NNs), learning by log-linear classifiers, or various matrix formulations. Lately, word2vec, that uses classifiers, has gained prominence as a machine learning technique which is used in the natural language processing and machine translation domains to produce vectors which capture syntactic as well semantic properties of words. Matrix based techniques that first extract a matrix from the text and then optimize a function over the matrix have recently achieved similar functionality to that of word2vec in producing vectors. However, there is no mechanism in place to identify and/or process concepts in an ingested corpus which are more than merely a sequence of words. Nor are traditional QA systems able to identify and process concept attributes in relation to other concept attributes or in relation to changes in the concept relationships over time. Nor do such systems provide any mechanism for dynamically generating concept-based content based on concepts of potential interest to the user. Instead, existing attempts to deal with concepts generate vector representations of words that carry various probability distributions derived from simple text in a corpus, and therefore provide only limited capabilities for content authoring applications, such as NLP parsing, identification of analogies, and machine translation. As a result, the existing solutions for efficiently identifying and applying concepts contained in a corpus are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to generate or extract a sequence of concepts, to extract or compute therefrom a distributed representation of the concept(s) (i.e., concept vectors), and to process the distributed representation (the concept vectors) to carry out useful tasks in the domain of concepts and user-concept interaction, including content authoring applications that analyze the written content prepared by a user in a current or previous session to help identify concepts and/or associated text in one or more data sources that are of likely interest to the user because they contain additional information related to the user's written content. In selected embodiments, the information handling system may be embodied as a question answering (QA) system which has access to structured, semi-structured, and/or unstructured content contained or stored in one or more large knowledge databases (a.k.a., "corpus"), and which extracts therefrom a sequence of concepts from annotated text (e.g., hypertext with concept links highlighted), from graph representations of concepts and their inter-relations, from tracking the navigation behavior of users, or a combination thereof. In other embodiments, concept vectors may also be used in a "discovery advisor" context where users would be interested in seeing directly the concept-concept relations, and/or use query concepts to retrieve and relate relevant documents from a corpus. To compute the concept vector(s), the QA system may process statistics of associations in the concept sequences using vector embedding methods. However generated, the concept vectors may be processed to enable improved presentation and visualization of concepts and their inter-relations and to improve the quality of answers provided by the QA system by using a content authoring engine to provide the user with additional data sources of likely interest by analyzing the user's written content to provide (1) a recommended list of concepts for adding links (when a new link is made between two concepts) or deleting links (when a link is deleted between two concepts), (2) a recommended listed of related concepts which includes concepts having no existing links between the underlying documents, where the recommended listed of related concepts may be restricted to a specific area of relatedness, and/or (3) a recommended listed of related concepts which includes content suggestions and topics generated on-the-fly based on what is being written. In selected embodiments, the additional information sources may be vetted to a variety of different degrees depending on the applicable content subject matter (e.g., scientific vs popular writing) so that the user can select the kinds of information sources from which recommendations are provided.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
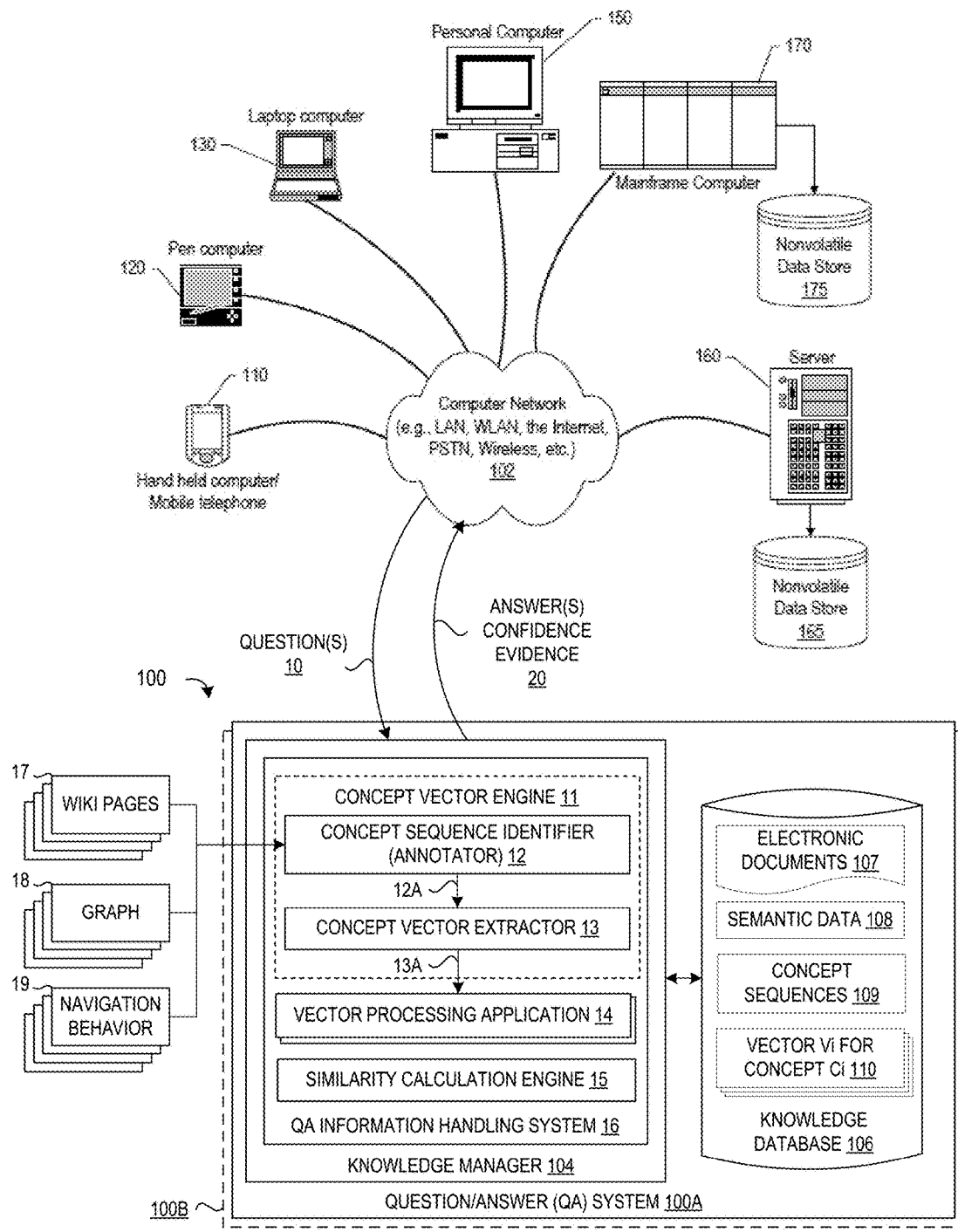
FIG. 1 depicts a network environment that includes a knowledge manager that extracts concept vectors from a knowledge base and generates concept-based content using the extracted concept vectors.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102 in which the QA system 100 uses a vector concept engine 11 to extract concept vectors from a knowledge database 106 and uses a vector processing application 14 to generate or author content by using the extracted concept vectors to identify concepts and additional information sources that are of potential interest to the user by virtue of being related to the written content prepared by a user in a current or previous session. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 which stores electronic documents 107, semantic data 108, or other possible sources of data input. In selected embodiments, the knowledge database 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to questions. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in electronic documents 107 for use as part of a corpus of data with knowledge manager 104. Content may also be created and hosted as information in one or more external sources 17-19, whether stored as part of the knowledge database 106 or separately from the QA system 100A. In addition, content may be created when the user explores a plurality of concepts in one or more external sources 17-19 so as to look for reference materials or inspirations that can assist his authoring of content. Wherever stored, the content may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content 108, the process can use a variety of conventions to query it from the knowledge manager. One convention is to send a question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter for identifying and processing concept vectors which may aid in the process of answering questions. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

To improve the quality of answers provided by the QA system 100, the concept vector engine 11 may be embodied as part of a QA information handling system 16 in the knowledge manager 104, or as a separate information handling system, to execute a concept vector identification process that extracts a sequence of concepts from annotated text sources 17 (e.g., sources specializing in concepts, such as Wikipedia pages with concepts highlighted or hyperlinked), from graph representations 18 of concepts and their inter-relations, from tracking the navigation behavior of users 19, or a combination thereof, and to construct therefrom one or more vectors for each concept 110. Syntactically, a "concept" is a single word or a word sequence (e.g., "gravity", "supreme court", "Newton's second law", "Albert Einstein") which becomes a semantic "concept" once it has been designated by a community to have a special role, namely—as representing more than just a sequence of words. In addition, a concept has many attributes: field of endeavor, origin, history, an associated body of work and/or knowledge, cultural and/or historical connotation and more. So, although superficially, words, phrases and concepts seem similar, a word sequence becomes a concept when it embeds a wider cultural context and a designation by a community, encompassing a significant meaning and presence in an area, in a historical context, in its relationships to other concepts and in ways it influences events and perceptions. It is worth emphasizing the point that not every well-known sequence of words is a concept, and the declaration of a sequence of words to be a concept is a community decision which has implications regarding naturally-arising sequences of concepts. With this understanding, the concept vector engine 11 may include a concept sequence identifier 12, such as an annotator, which accesses sources 17-19 for sequences of concepts embedded in texts of various kinds and/or which arise by tracking concept exploration behavior from examining non-text sources, such as click streams. As different concept sequences are identified, the adjacency of the concepts is tied to the closeness of the concepts themselves. Once concept sequences are available, a concept vector extractor 13 acts as a learning device to extract vector representations for the identified concepts. The resulting concept vectors 110 may be stored in the knowledge database 106 or directly accessed by one or more vector processing applications 14 which may be executed, for example, to identify, for a concept selected by the user, one or more related concepts are not linked to the selected concept so that the identified concept(s) can be displayed to promote understanding and interpretation of concept vector relationships.

To identify or otherwise obtain a sequence of concepts, a concept sequence identifier 12 may be provided to (i) access one or more wiki pages 17 or other text source which contains these concepts by filtering out words that are not concepts, (ii) algorithmically derive concept sequences from a graph 18 (e.g., a Concept Graph (CG)), (iii) track one or more actual users' navigation behavior 19 over concepts, or some modification or combination of one of the foregoing. For example, the concept sequence identifier 12 may be configured to extract concepts from a text source, but also some text words extracted per concept in the context surrounding the concept's textual description, in which case the concepts are "converted" to new unique words.

To provide a first illustrative example, the concept sequence identifier 12 may be configured to derive concept sequences 12A from one or more Wikipedia pages 17 by eliminating all words from a page that are not concepts (i.e., Wikipedia entries). For example, consider the following snippet from the Wikipedia page for Photonics at http://en.wikipedia.org/wiki/Photonics in which the concepts are underlined:

Photonics as a field began with the invention of the laser in 1960. Other developments followed: the laser diode in the 1970s, optical fibers for transmitting information, and the erbium-doped fiber amplifier. These inventions formed the basis for the telecommunications revolution of the late 20th century and provided the infrastructure for the Internet.

Though coined earlier, the term photonics came into common use in the 1980s as fiber-optic data transmission was adopted by telecommunications network operators. At that time, the term was used widely at Bell Laboratories. Its use was confirmed when the IEEE Lasers and Electro-Optics Society established an archival journal named *Photonics Technology Letters* at the end of the 1980s.

During the period leading up to the dot-com crash circa 2001, photonics as a field focused largely on optical telecommunications.

In this example, the concept sequence 12A derived by the concept sequence identifier 12 is: laser, laser diode, optical fibers, erbium-doped fiber amplifier, Internet, Bell Laboratories, IEEE Lasers and Electro-Optics Society, Photonics Technology Letters, dot-com crash. However, it will be appreciated that the concept sequence identifier 12 may examine a "dump" of Wikipedia pages 17 to obtain long concept sequences reflecting the whole collection of Wikipedia concepts.

In another illustrative example, the concept sequence identifier 12 may be configured to derive concept sequences 12A from one or more specific domains. For example, a pharmaceutical company's collection of concerned diseases, treatments, drugs, laboratory tests, clinical trials, relevant chemical structures and processes, or even biological pathways may be accessed by the concept sequence identifier 12 to extract domain-specific concept sequences. In this example, concept sequences may be extracted from company manuals, emails, publications, reports, and other company-related text sources.

In another illustrative example, the concept sequence identifier 12 may be configured to derive concept sequences 12A which also include non-concept text. For example, an identified concept sequence may include inserted "ordinary" or non-concept words which are used for learning. One option would be to use all the words from the original source text by converting "concept" words into "new" words by appending a predetermined suffix (e.g., "_01") to each concept. In the example "Photonics" page listed above, this approach would lead to the following first paragraph: "Photonics as a field began with the invention of the laser 01 in 1960. Other developments followed: the laser diode 01 in the 1970s, optical fibers 01 for transmitting information, and the erbium-doped fiber amplifier 01. These inventions formed the basis for the telecommunications revolution of the late 20th century and provided the infrastructure for the Internet 01."

Another option for deriving concept sequences with text would be to process the original source text by a filtering process that retains only the parts of the text relevant to a specific theme. For example, if the original source text consists of a collection of medical documents, a search procedure can be applied to identify and retrieve only the documents containing the word "cancer." The retrieved documents are taken as the theme-restricted collection for deriving the concept sequences.

Another option for deriving concept sequences with text would be to process the original source text to keep only words that are somewhat infrequent as indicated by an occurrence threshold, and that are in close proximity to a concept. In the example "Photonics" page listed above, this approach would lead to the following first paragraph: "invention laser 01 1960. developments laser diode 01 1970s, optical fibers 01 transmitting information erbium-doped fiber amplifier 01 telecommunications revolution infrastructure Internet 01."

Another option for deriving concept sequences is to construct sequences of concepts and words in units and (potentially rearranged) orderings, as determined by a natural language parser.

Another option for deriving concept sequences with text would be to explicitly specify a collection of words or types of words to be retained in the concept sequence. For example, one may have a specified collection of words connected to medicine (e.g., nurse, doctor, ward and operation), and the derived concept sequence would limit retained non-concept words or text to this specified collection.

To provide a second illustrative example of the concept sequence identifier process, the concept sequence identifier 12 may be configured to derive concept sequences (e.g., 12A) from one or more concept graphs 18 having nodes which represent concepts (e.g., Wikipedia concepts). As will be appreciated, a graph 18 may be constructed by any desired method (e.g., Google, etc.) to define "concept" nodes which may be tagged with weights indicating their relative importance. In addition, an edge of the graph is labeled with the strength of the connection between the concept nodes it connects. When edge weights are given, they indicate the strength or closeness of these concepts, or observed and recorded visits by users in temporal proximity. An example way of relating the edge weights to user visits is to define the edge weight connecting concept "A" to concept "B" to be the number of times users examined concept "A" and, within a short time window, examined concept "B".

Using the Wikipedia example, if a Wikipedia page "A" has a link to another Wikipedia page "B," then the graph 18 would include an edge connecting the "A" concept to the "B" concept. The weight of a node (importance) or the weight (strength) of an edge of an edge may be derived using any desired technique, such as a personalized Pagerank of the graph or other techniques. In addition, each concept i in the graph 18 may be associated with a (high dimensional) P-vector such that the $j^{th}$ entry of the P-vector corresponding to concept i is the strength of the connection between concept i and concept j. The entries of the P-vector may be used to assign weights to graph edges. To derive concept sequences from the concept graph(s) 18, the concept sequence identifier 12 may be configured to perform random walks on the concept graph(s) 18 and view these walks as concept sequences. For example, starting with a randomly chosen starting node v, the concept sequence identifier 12 examines the G-neighbors of v and the weights on the edges connecting v and its neighboring nodes. Based on the available weights (if none are available, the weights are considered to be equal), the next node is randomly chosen to identify the next node (concept) in the sequence where the probability to proceed to a node depends on the edge weight and the neighboring node's weight relative to other edges and neighboring nodes. This random walk process may be continued until a concept sequence of length His obtained, where H may be a specified parametric value (e.g., 10,000). Then, the random walk process may be repeated with a new randomly selected starting point. If desired, the probability of selecting a node as a starting node may be proportional to its weight (when available). The result of a plurality of random walks on the graph 18 is a collection of length H sequences of concepts 12A.

Extracting sequences from the concept graph(s) 18 may also be done by using a random walk process in which each step has a specified probability that the sequence jumps back to the starting concept node (a.k.a., "teleportation"), thereby mimicking typical navigation behavior. Alternatively, a random walk process may be used in which each step has a specified probability that the sequence jumps back to the previous concept node, thereby mimicking other typical navigation behavior. If desired, a combination of the foregoing step sequences may be used to derive a concept sequence. Alternatively, a concept sequence may be derived by using a specified user behavior model M that determines the next concept to explore. Such a model M may employ a more elaborate scheme in order to determine to which concept a user will examine next, based on when previous concepts were examined and for what duration.

The resulting concept sequences 12A may be stored in the knowledge database 109 or directly accessed by the concept vector extractor 13. In addition, whenever changes are made to a concept graph 18, the foregoing process may be repeated to dynamically maintain concept sequences by adding new concept sequences 12A and/or removing obsolete ones. By revisiting the changed concept graph 18, previously identified concept sequences can be replaced with new concept sequences that would have been used, thereby providing a controlled time travel effect.

In addition to extracting concepts from annotated text 17 and/or graph representations 18, concept sequences 12A may be derived using graph-based vector techniques whereby an identified concept sequence 12A also includes a vector representation of the concept in the context of graph G (e.g., Pagerank-derived vectors). This added information about the concepts in the sequence 12A can be used to expedite and qualitatively improve the learning of parameters process, and learning quality, by providing grouping, i.e., additional information about concepts and their vicinity as embedded in these G-associated vectors.

To provide a third illustrative example of the concept sequence identifier process, the concept sequence identifier 12 may be configured to derive concept sequences (e.g., 12A) from the user navigation behavior 19 where selected pages visited by a user (or group of users) represent concepts. For example, the sequences of concepts may be the Wikipedia set of entries explored in succession by (a) a particular user, or (b) a collection of users. The definition of succession may allow non-Wikipedia intervening web exploration either limited by duration T (before resuming Wikipedia), number of intervening non-Wikipedia explorations, or a combination of theses or related criteria. As will be appreciated, user navigation behavior 19 may be captured and recorded using any desired method for tracking a sequence of web pages a user visits to capture or retain the "concepts" corresponding to each visited page and to ignore or disregard the pages that do not correspond to concepts. Each concept sequence 12A derived from the captured navigation behavior 19 may correspond to a particular user, and may be concatenated or combined with other user's concept sequences to obtain a long concept sequence for use with concept vector training. In other embodiments, the navigation behavior of a collection of users may be tracked to temporally record a concept sequence from all users. While such collective tracking blurs the distinction between individual users, this provides a mechanism for exposing a group effort. For example, if the group is a limited-size departmental unit (say, up to 20), the resulting group sequence 12A can reveal interesting relationships between the concepts captured from the user navigation behavior 19. The underlying assumption is that the group of users is working on an interrelated set of topics.

To provide another illustrative example of the concept sequence identifier process, the concept sequence identifier 12 may be configured to generate concept sequences using concept annotations created by two or more different annotators, where each annotator uses its chosen set of names to refer to the collection of concepts included in a text source. For example, one annotator applied to a text source may mark up all occurrences of the concept of "The United State of America" as "U.S.A.", whereas another may mark it up as "The United States". In operation, a first concept sequence may be generated by extracting a first plurality of concepts from a first set of concept annotations for the one or more content sources, and a second concept sequence may be generated by extracting a second plurality of concepts from a second set of concept annotations for the one or more content sources. In this way, the concept sequence identifier 12 may be used to bring together different annotated versions of a corpus. In another example, a first set of concept annotations may be a large collection of medical papers that are marked up with concepts that are represented in the Unified Medical Language System (UMLS) Metathesaurus. The second set of concept annotations may the same collection of medical papers that are marked up with concepts that are defined in the English Wikipedia. Since these two dictionaries have good overlap but they are not identical, they may refer to the same thing (e.g., leukemia) differently in the different sets of concept annotations.

In addition to identifying concept sequences 12A from one or more external sources 17-19, general concept sequences may be constructed out of extracted concept sequences. For example, previously captured concept sequences 109 may include a plurality of concept sequences S1, S2, . . . , Sm which originate from various sources. Using these concept sequences, the concept sequence identifier 12 may be configured to form a long sequence S by concatenating the sequences S=S1S2 . . . Sm.

Once concept sequences 12A are available (or stored 109), a concept vector extractor 13 may be configured to extract concept vectors 13A based on the collected concept sequences. For example, the concept vector extractor 13 may employ a vector embedding system (e.g., Neural-Network-based, matrix-based, log-linear classifier-based or the like) to compute a distributed representation (vectors) of concepts 13A from the statistics of associations embedded within the concept sequences 12A. More generally, the concept vector extractor 13 embodies a machine learning component which may use Natural Language Processing or other techniques to receive concept sequences as input. These sequences may be scanned repeatedly to generate a vector representation for each concept in the sequence by using a method, such as word2vec. Alternatively, a matrix may be derived from these sequences and a function is optimized over this matrix and word vectors, and possibly context vectors, resulting in a vector representation for each concept in the sequence. Other vector generating methods, such as using Neural Networks presented by a sequence of examples derived from the sequences, are possible. The resulting concept vector may be a low dimension (about 100-300) representation for the concept which can be used to compute the semantic and/or grammatical closeness of concepts, to test for analogies (e.g., "a king to a man is like a queen to what?") and to serve as features in classifiers or other predictive models. The resulting concept vectors 13A may be stored in the knowledge database 110 or directly accessed by one or more vector processing applications 14.

To generate concept vectors 13A, the concept vector extractor 13 may process semantic information or statistical properties deduced from word vectors extracted from the one or more external sources 17-19. To this end, the captured concept sequences 12A may be directed to the concept vector extraction function or module 13 which may use Natural Language Processing (NLP) or machine learning processes to analyze the concept sequences 12A to construct one or more concept vectors 13A, where "NLP" refers to the field of computer science, artificial intelligence, and linguistics concerned with the interactions between computers and human (natural) languages. In this context, NLP is related to the area of human-to-computer interaction and natural language understanding by computer systems that enable computer systems to derive meaning from human or natural language input. To process the concept sequences 12A, the concept vector extractor 13 may include a learning or optimization component which receives concept sequence examples 12A as Neural Network examples, via scanning text, and the like. In the learning component, parameters (Neural Network weights, matrix entries, coefficients in support vector machines (SVMs), etc.) are adjusted to optimize a desired goal, usually reducing an error or other specified quantity. For example, the learning task in the concept vector extractor 13 may be configured to implement a scanning method where learning takes place by presenting examples from a very large corpus of Natural Language (NL) sentences. The examples may be presented as Neural Network examples, in which the text is transformed into a sequence of examples where each example is encoded in a way convenient for the Neural Network intake, or via scanning text where a window of text is handled as a word sequence with no further encoding. In scanning methods, the learning task is usually to predict the next concept in a sequence, the middle concept in a sequence, concepts in the context looked at as a "bag of words," or other similar tasks. The learning task in the concept vector extractor 13 may be also configured to implement a matrix method wherein text characteristics are extracted into a matrix form and an optimization method is utilized to minimize a function expressing desired word vector representation. The learning results in a matrix (weights, parameters) from which one can extract concept vectors, or directly in concept vectors (one, or two per concept), where each vector Vi is associated with a corresponding concept Ci. Once the learning task is complete, the produced concept vectors may have other usages such as measuring "closeness" of concepts (usually in terms of cosine distance) or solving analogy problems of the form "a to b is like c to what?"

To provide a first illustrative example for computing concept vectors from concept sequences, the concept vector extractor 13 may be configured to employ vector embedding techniques (e.g., word2vec or other matrix factorization and dimensionality reduction techniques, such as NN, matrix-based, log-linear classifier or the like) whereby "windows" of k (e.g., 5-10) consecutive concepts are presented and one is "taken out" as the concept to be predicted. The result is a vector representation for each concept. Alternatively, the concept vector extractor 13 may be configured to use a concept to predict its neighboring concepts, and the training result produces the vectors. As will be appreciated, other vector producing methods may be used. Another interesting learning task by which vectors may be created is that of predicting the next few concepts or the previous few concepts (one sided windows).

To provide another illustrative example for computing concept vectors 13A from concept sequences 12A, the concept vector extractor 13 may be configured to employ NLP processing techniques to extract a distributed representation of NLP words and obtain vectors for the concept identifiers. As will be appreciated, the size of the window may be larger than those used in the NLP applications so as to allow for concepts to appear together in the window. In addition, a filter F which can be applied to retain non-concept words effectively restricts the words to only the ones that have a strong affinity to their nearby concepts as measured (for example, by their cosine distance to the concept viewed as a phrase in an NLP word vector production, e.g., by using word2vec).

To provide another illustrative example for computing concept vectors 13A from concept sequences 12A, the concept vector extractor 13 may be configured to employ NLP processing techniques to generate different concept vectors from different concept sequences by supplying a first plurality of concepts (extracted from a first set of concept annotations) as input to the vector learning component to generate the first concept vector and by supplying a second plurality of concepts (extracted from a second set of concept annotations) as input to the vector learning component to generate a second concept vector. If both versions of concept sequence annotations are brought together to obtain first and second concept vectors, the resulting vectors generated from the different concept sequence annotations can be compared to one another by computing similarities therebetween. As will be appreciated, different annotators do not always mark up the same text spans in exactly the same way, and when different annotation algorithms choose to mark up different occurrences of the term, a direct comparison of the resulting concept vectors just by text alignment techniques is not trivial. However, if both versions of annotated text sources are included in the embedding process, by way of association with other concepts and non-concept words, the respective concept vectors can be brought to close proximity in the embedding space. Computing similarities between the vectors could reveal the linkage between such alternative annotations.

Once concept vectors 13A are available (or stored 110), they can be manipulated in order to answer questions such as "a king is to man is like a queen is to what?", cluster similar words based on a similarity measure (e.g., cosine distance), or use these vectors in other analytical models such as a classification/regression model for making various predictions. For example, one or more vector processing applications 14 may be applied to carry out useful tasks in the domain of concepts and user-concept interaction, allowing better presentation and visualization of concepts and their inter-relations (e.g., hierarchical presentation, grouping, and for a richer and more efficient user navigation over the concept graph). For example, an application 14 may access n vectors V1, . . . , Vn of dimension d which represent n corresponding concepts C1, . . . , Cn, where a vector Vi is a tuple (vi1, . . . , vid) of entries where each entry is a real number. Concept vector processing may include using a similarity calculation engine 15 to calculate a similarity metric value between (1) one or more concepts (or nodes) in an extracted concept sequence (e.g., 109) and/or (2) one or more extracted concept vectors (e.g., 110). Such concept/vector processing at the similarity calculation engine 15 may include the computation of the dot product of two vectors Vh and Vi, denoted dot(Vh,Vi) is $\Sigma j=1, \ldots, d\ Vhj*Vij$. In concept vectors processing, the length of vector Vi is defined as the square root of dot(Vi,Vi), i.e., SQRT(dot(Vi,Vi)). In addition, concept vector processing at the similarity calculation engine 15 may include computation of the cosine distance between Vh and Vi, denoted cos(Vh,Vi), is dot(Vh, Vi)/(length(Vh)*length(Vi)). The cosine distance is a measure of similarity, where a value of "1" indicates very high similarity and a value of "−1" indicates very weak similarity. As will be appreciated, there are other measures of similarity that may be used to process concept vectors, such as soft cosine similarity. In addition, it will be appreciated that the concept vector processing may employ the similarity calculation engine 15 as part of the process for extracting concept sequences 12, as part of the process of concept vector extraction 13, or as concept vector processing step for identify concepts that are related to a concept selected by an author/user who is composing content so that the identified concept(s) can assist the author/user understand and interpret the concepts and their inter-relations.

To provide a first illustrative example application for processing concept vectors 13A, a vector processing application 14 may be configured to provide immediate hints identifying concepts of potential interest to the user by analyzing user's written or viewed content to potentially enrich their discourse by pointing user to one or more data sources that illustrate additional information related to the user's written/viewed content. In an example embodiment where a user's word processor (or slide editor) is being used to write or view content as pages are scrolled up and down, the vector processing application 14 may be hooked up to the word processor/slide editor to generate content recommendations which are dynamically adjusted as the visible content in the word processor/slide editor changes. In other embodiments, additional data sources may be generated from user-explored concepts (e.g., Wikipedia concepts or more generally, the concepts in a Knowledge Graph which connects concepts by edges of one or more types) when the user selects a concept Ci, such as by placing a mouse over the concept Ci. In response, the vector processing application 14 may process the extracted concept vectors 13A to identify and display the top U concepts whose vectors having a high cosine distance to a vector constructed from Vi and vectors of concepts occurring in close vicinity to the concept Ci in the Wikipedia page (e.g., 3 preceding and 3 following it), where U and the vicinity parameters may be programmable. The constructed vector can be such that the weight of Ci is higher than that of its neighbors and the average is a weighted average. Based on the computation results, the vector processing application 14 may be configured to automatically display the top U concepts to the user when the cursor passes over the concept Ci. In other embodiments, the cosine distance metric values may be used to control the subject matter proximity of the content recommendations to range from an "exploratory" domain (where the user is provided with a fairly diverse set of concepts and passages that are similar, but not too similar, to the concepts and passages in the user's written content) to an "exploitative" domain (where the user is provided with content concepts and passages that are more specific and similar to the concepts and passages in the user's written content). Between these extremes on the exploratory and exploitative domains, the user may be provided with the option of controlling how far to go between the domains.

To provide another illustrative example application for processing concept vectors 13A, a vector processing application 14 may be configured to automatically provide a list of concepts that may also contain a link to the Wikipedia page of a first concept (e.g., ConceptB) that is added to a Wikipedia page of a second concept (e.g., ConceptA). For example, the vector processing application 14 may process the extracted concept vectors 13A to construct a sorted list of the top M concepts according to the cosine distance with ConceptB, where M is a parameter (e.g., M=40). If the vector processing application 14 determines that ConceptA is in the list of M concepts and also determines that there is a concept ConceptX in the list which ranks higher than ConceptA, but does not have a link to ConceptB (i.e., higher cosine distance to ConceptB), then the vector processing application 14 may be configured to recommend adding a link from ConceptX to ConceptB. In case there is more than one such concept ConceptX, the vector processing application 14 may recommend adding to some or all of them based on user set parameters. An analogous treatment exists for link removal where the vector processing application 14 finds a Conceptx in the list that has a link to ConceptB and its cosine distance is less than the cosine distance between ConceptA and ConceptB, at which point Conceptx is removed as being dissimilar to the selected ConceptB.

To provide another illustrative example application for processing concept vectors 13A, a vector processing application 14 may be configured to recommend connecting concepts. For example, after a user explores a plurality of concepts (e.g., Wikipedia concepts), the user may request the user's browser to identify concepts that are strongly related to each other, though their Wikipedia pages do not point each other. Such requests can be restricted to a specific subject area. In response, the vector processing application 14 may process the extracted concept vectors 13A to identify ConceptA and ConceptB such that each is among the top R concepts in terms of cosine distance to the other and there is no link from the page of ConceptA to that of ConceptB or vice versa. Based on the computation results, the vector processing application 14 may be configured to recommend adding a link from the page of ConceptA to that of ConceptB and vice versa. In embodiments where the link recommendation for connecting concepts is restricted to a specific area, the vector processing application 14 identifies the restricted area from a specified collection of concepts where each concept is weighted so that the weights sum up to 1, and then constructs a corresponding area vector by summing the corresponding vectors, each weighted by the weight of its concept. In this example where VA is the area vector, the vector processing application 14 may be configured to restrict ConceptA and ConceptB such that their cosine distance to VA is at least a programmable parameter U (e.g., U=0.75).

The vector processing application 14 may also include a display component for providing multi-dimensional visualization of the concept vectors such that the concept vectors may be displayed with 2-dimensional or 3-dimensional visualizations. In an example embodiment, an embedding procedure, such as multi-dimensional scaling or t-SNE (t-Distributed Stochastic Neighbor Embedding), may be employed to convert each concept vector to a point in a two or three dimensional space, allowing the vectors to be displayed as scatter plots. In other embodiments, high-dimensional concept vectors can also be displayed directly by using a plot of parallel coordinates, which is a line chart in two dimensions, with the x-coordinate listing each dimension in order (e.g., 1, 2, 3, . . . , n for an n-dimensional vector) and the y-coordinate being the value of the vector in the respective dimension. The values for the same vector are joined by a line. The display of concepts may also include additional indications of a user's navigation history through the included concepts, such as arrows connecting the dots in a t-SNE display, and suggestions of what to explore next.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include a pen or tablet computer 120, laptop or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems.

Figure 2:
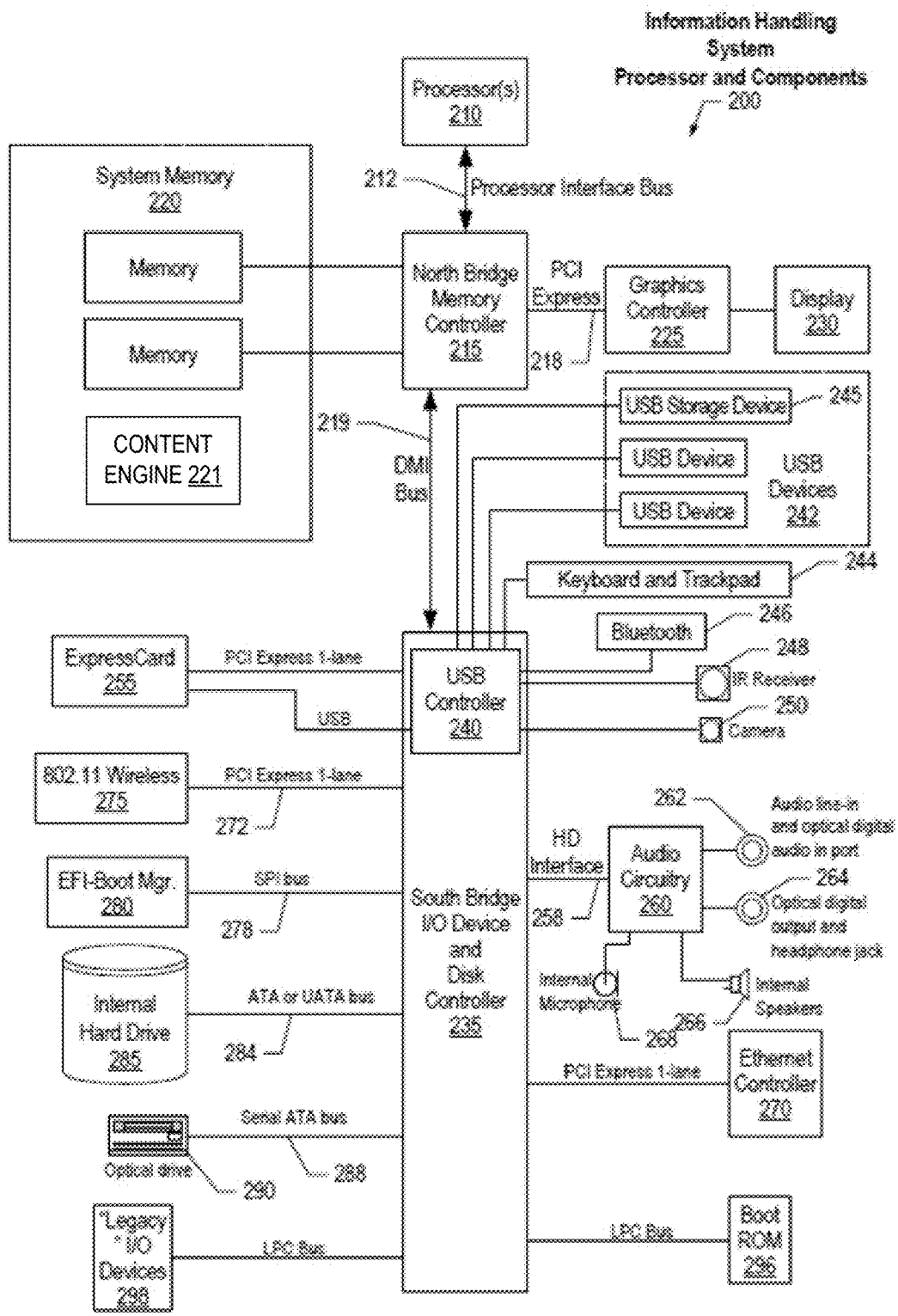
FIG. 2 is a block diagram of a processor and components of an information handling system such as those shown in FIG. 1.

FIG. 2 illustrates an illustrative example of an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a content engine module 221 which may be invoked to extract concept vectors from user interactions and data sources and thereby identify concepts of likely interest to the user based on the generation and manipulation of similarity metrics computed from the concept vectors to promote user understanding of an area. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) and the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one example configuration for an information handling system 200, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
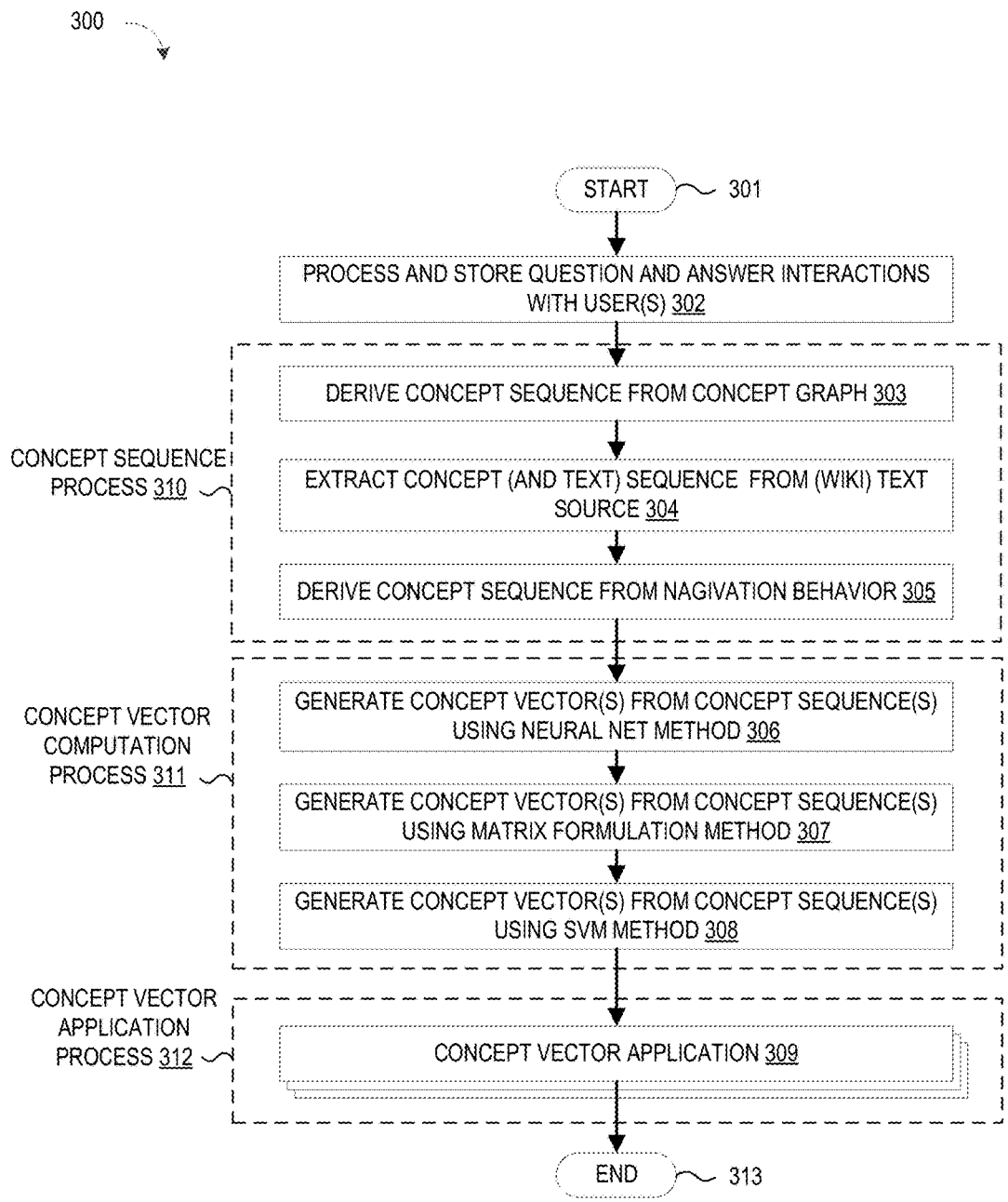
FIG. 3 illustrates a simplified flow chart showing the logic for obtaining and using a distributed representation of concepts as vectors.

To provide additional details for an improved understanding of selected embodiments of the present disclosure, reference is now made to FIG. 3 which depicts a simplified flow chart 300 showing the logic for obtaining and using a distributed representation of concepts as vectors. The processing shown in FIG. 3 may be performed in whole or in part by a cognitive system, such as the QA information handing system 15, QA system 100, or other natural language question answering system which identifies sequences of concepts to extract concept vectors (e.g., distributed representations of the concept) which may be processed to carry out useful tasks in the domain of concepts and user-concept interaction.

FIG. 3 processing commences at 301 whereupon, at step 302, a question or inquiry from one or more end users is processed to generate an answer with associated evidence and confidence measures for the end user(s), and the resulting question and answer interactions are stored in an interaction history database. The processing at step 302 may be performed at the QA system 100 or other NLP question answering system, though any desired information processing system for processing questions and answers may be used. As described herein, a Natural Language Processing (NLP) routine may be used to process the received questions and/or generate a computed answer with associated evidence and confidence measures. In this context, NLP is related to the area of human-computer interaction and natural language understanding by computer systems that enable computer systems to derive meaning from human or natural language input.

In the course of processing questions to generate answers, a collection or sequence of concepts may be processed at step 310. The concept sequence processing at step 310 may be performed at the QA system 100 or concept vector engine 13 by employing NLP processing and/or extraction algorithms, machine learning techniques, and/or manual processing to collect concepts from one or more external sources (such as the Wikipedia or some other restricted domain, one or more concept graph sources, and/or captured user navigation behavior) to generate training input comprising concept sequences. As will be appreciated, one or more processing steps may be employed to obtain the concept sequences.

For example, the concept sequence processing at step 310 may employ one or more concept graphs to generate concept sequences at step 303. To this end, the concept graph derivation step 303 may construct a graph G using any desired technique (e.g., a graph consisting of Wikipedia articles as nodes and the links between them as edges) to define concepts at each graph node which may be tagged with weights indicating its relative importance. In addition, the graph edges may be weighted to indicate concept proximity. By traversing the graph G using the indicated weights to affect the probability of navigating via an edge, a sequence of concepts may be constructed at step 303. In contrast to existing approaches for performing short random walks on graph nodes which view these as sentences and extract a vector representation for each node, the graph derivation step 303 may employ a random walk that is directed by the edge weights such that there is a higher probability to traverse heavier weight edges, thereby indicating closeness of concepts. In addition, the concept graphs employed by the graph derivation step 303 encodes many distinct domains may be represented as graphs that are derived non-trivially from the conventional web graph. In addition, the graph derivation step 303 may allow a graph traversal with a "one step back" that is not conventionally available. As a result, the resulting concept vectors are quite different.

In addition or in the alternative, the concept sequence processing at step 310 may employ one or more text sources to extract concept sequences at step 304. In selected embodiments, the text source is the Wikipedia set of entries or some other restricted domain. By analyzing a large corpus of documents mentioning Wikipedia entries (e.g., Wikipedia itself and other documents mentioning its entries), the text source extraction step 304 may extract the sequence of concepts, including the title, but ignoring all other text. In addition, the text source extraction step 304 may extract the sequence of appearing concepts along with additional words that are extracted with the concept in the context of surrounding its textual description while using a filter to remove other words not related to the extracted concepts. Alternatively, the text source extraction step 304 may extract a mixture of concepts and text by parsing a text source to identify concepts contained therein, replacing all concept occurrences with unique concept identifiers (e.g., by appending a suffix to each concept or associating critical words with concepts).

In addition or in the alternative, the concept sequence processing at step 310 may employ behavior tracking to derive concept sequences at step 305. In selected embodiments, the actual user's navigation behavior is tracked to use the actual sequence of explored concepts by a single user or a collection of users to derive the concept sequence at step 305. In selected embodiments, the tracking of user navigation behavior may allow non-Wikipedia intervening web exploration that is limited by duration T before resuming Wikipedia, by the number of intervening non-Wikipedia explorations, by elapsed time or a combination of these or related criteria.

After the concept sequence processing step 310, the collected concept sequences may be processed to compute concept vectors using known vector embedding methods at step 311. As disclosed herein, the concept vector computation processing at step 311 may be performed at the QA system 100 or concept vector extractor 12 by employing machine learning techniques and/or NLP techniques to compute a distributed representation (vectors) of concepts from the statistics of associations. As will be appreciated, one or more processing steps may be employed to compute the concept vectors. For example, the concept vector computation processing at step 311 may employ NL processing technique such as word2vec or to implement a neural network (NN) method at step 306 to perform "brute force" learning from training examples derived from concept sequences provided by step 310. In addition or in the alternative, the concept vector computation processing at step 311 may employ various matrix formulations at method step 307 and/or extended with SVM-based methods at step 308. In each case, the vector computation process may use a learning component in which selected parameters (e.g., NN weights, matrix entries, vector entries, etc.) are repeatedly adjusted until a desired level of learning is achieved.

After the concept vector computation processing step 311, the computed concept vectors may be used in various applications at step 312 which may be performed at the QA system 100 or the concept vector application module 14 by employing NLP processing, artificial intelligence, extraction algorithms, machine learning model processing, and/or manual processing to process the distributed representation (concept vectors) to carry out useful tasks in the domain of concepts and user-concept interaction. For example, a navigation prediction application 309 performed at step 312 may be executed which generates navigation prediction or suggestions for a user based on the user's concept exploration sequence to date. For example, the navigation prediction application 309 may use the last k concepts visited by the user to predict the (k+1)'st concept to be visited. In addition or in the alternative, the navigation prediction application 309 may open a window with a "suggested next related concept" for optional selection by the user. The navigation hints may also be given in a graphical display, if the concept vectors are represented in a 2D or 3D dimensional map (for example, using a multi-dimensional scaling procedure or a method like t-SNE, or t-distributed Stochastic Neighbor Embedding).

Application processing at step 312 may also be implemented with a concept group formation application 309 where the user presents a group of related concepts (e.g., 3) and invokes the concept group formation application 309 to identify the most likely concept that fits with this group. This may also be used to create groups of concepts that together create a "super concept", one that may not even exist yet in the community.

Another application 309 executed at the application processing step 312 is executed to identify missing concepts. For example, the missing concepts application 309 may use the concept vectors for two concepts, C1 and C2, to determine that these concepts are similar in their respective domains. Upon also determining that C1 has a strong connection to another concept C1' but that C2 has no such analog, the missing concepts application 309 identifies a "missing concept" in the domain of C2.

Application processing at step 312 may also be implemented with a concept motif identification application 309 which processes the concept vectors to define frequently occurring patterns of concepts and their relationships or connections to each other.

A link prediction application 309 may also be executed at step 312 to identify a new link between two concepts that are strongly related, yet have no link between them. The new link may go in both directions, depending on the strength of the relationship and how such strength compares against others in the neighborhood. For example, if concepts A and B are strongly related and concept A is highly ranked in B's relations, a link from B to A is identified and presented.

As will be appreciated, each of the concept vector applications 309 executed at step 312 can be tailored or constrained to a specified domain by restricting the corpus input to only documents relevant to the domain and/or restricting concept sequences to the domain and/or restricting remaining words to those of significance to the domain.

Figure 4:
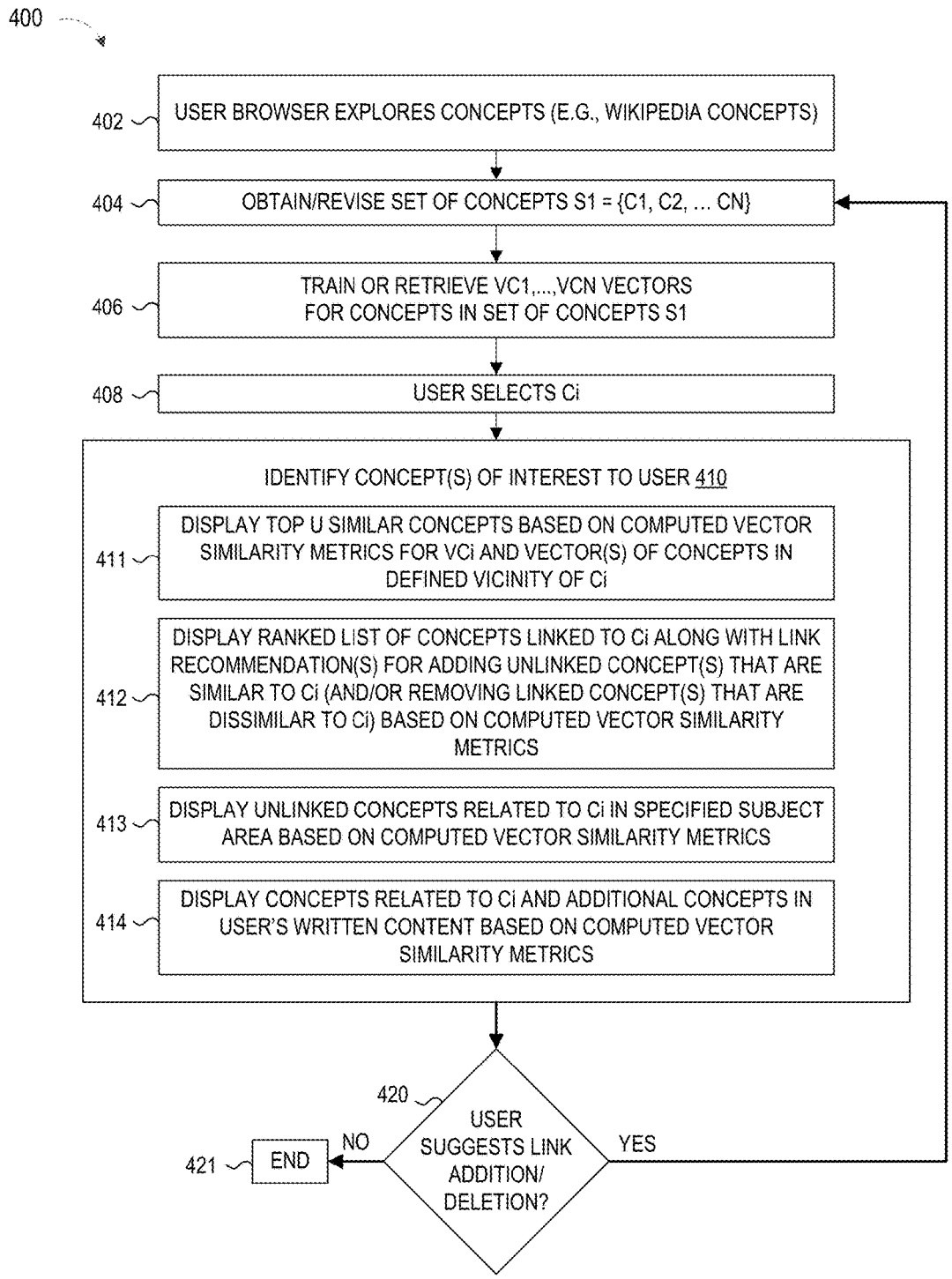
FIG. 4 illustrates a simplified flow chart showing the logic for processing concept vectors to identify and display concepts and their inter-relations by displaying content suggestions.

To provide additional details for an improved understanding of selected embodiments of the present disclosure, reference is now made to FIG. 4 which depicts a simplified flow chart 400 showing the logic and method steps for processing concept vectors to identify and display concepts and their inter-relations by displaying content suggestions of potential interest to the user. The processing shown in FIG. 4 may be performed in whole or in part by a cognitive system, such as the QA information handing system 16, QA system 100, or other natural language question answering system which uses concept vectors to generate recommendations of related concepts for use when authoring content.

FIG. 4 processing commences at step 401 when a user logs onto his computer and uses the browser to access the corpus. At step 402, the user explores a collection of concepts in the corpus. For example, the user may be an author who uses a browser to explore a plurality of concepts (e.g., Wikipedia concepts) to look for reference materials or inspirations that can assist with authoring of content. In selected embodiments, concepts being explored may be hosted as information in one or more external sources 17-19 that are accessed by the QA information handing system 16.

At step 404, the process continues by capturing, retrieving, or otherwise obtaining at least one input set of concepts, such as a concept sequence S1={C1, . . . , Cn}. In selected embodiments, the input concept sequence S1 may be retrieved from storage in a database, or may be generated by a concept sequence identifier (e.g., 12) that extracts a sequence of concepts from annotated text sources 17 (e.g., sources specializing in concepts, such as Wikipedia pages with concepts highlighted or hyperlinked). In selected embodiments, the collected concept sequence can be restricted to C1, . . . , Ck by deleting selected concepts (e.g., Ck+1, . . . , Cn). Alternatively, the concept sequence S1 can be restricted to selected concepts (e.g., C1, . . . , Ck) and concepts that are highly related to them, i.e., those whose cosine distance to some concept C in C1, . . . , Ck is among the U (a parameter, e.g. 3) highest cosine distances to these concepts.

At step 406 one or more concept vectors VC1, . . . , VCn, may be generated to serve as representations for C1, . . . , Cn, such as by using concept sequences obtained at step 404 to compute or train concept vectors VC1, . . . , VCn, for the concepts in the concept sequence S1 using any desired vector embedding techniques. As disclosed herein, the concept vector computation processing at step 406 may be performed at the QA system 100 or concept vector extractor 13 by employing machine learning techniques and/or NLP techniques to compute a distributed representation (vectors) of concepts VC1, . . . , VCn which are trained on the concepts from the input sequence S1. For example, the concept vector computation processing at step 406 may employ NL processing technique such as word2vec or to implement a neural network (NN) method to perform "brute force" learning from training examples derived from concept sequences that contain those concepts in S1. In addition or in the alternative, the concept vector computation processing at step 406 may employ various matrix formulations and/or extended with SVM-based methods. In each case, the vector computation process may use a learning component in which selected parameters (e.g., NN weights, matrix entries, vector entries, etc.) are repeatedly adjusted until a desired level of learning is achieved. Though illustrated as occurring after step 404, the vector extraction step 406 may be skipped in situations where the concept vectors were previously extracted or computed. In selected embodiments, a set of vector representations based on a selected concept subset C1, . . . , Ck can be learned by first restricting the sequence of concepts to C1, . . . , Ck (by deleting the others) and then learning the vector representation VC1, . . . , VCk.

At step 408, the user selects one of the concepts Ci, such as by placing a mouse over a concept Ci. In response, the extracted concept vectors may be processed at step 410 to identify one or more concepts that may be of potential interest to the user by virtue of being related or similar to the selected concept Ci. As disclosed herein, the identification of related concepts at step 410 may be performed at the QA system 100 or vector processing application 14 to provide a recommended listed of concepts that are related to the selected concept Ci. To find related concepts, the concept identification step 410 may use the similarity calculation engine 15 to compute vector similarity metric values between different concept vectors (e.g., sim(VCi, VCj) for j=1, . . . , N, j≠i). In an example embodiment, the vector similarity metric values may be computed by configuring the QA system 100 or vector processing applications 14 to compute, for each concept Ci, the cosine similarity metric value cos(VCi,VCj) for j=1, . . . , N, j≠i. As disclosed herein, the concept identification at step 410 may be implemented using a variety of different identification algorithms.

To provide a first illustrative example application for identifying related concepts at step 410, the extracted concept vectors may be processed to provide immediate hints identifying concepts of interest at step 411 by displaying the top U similar concepts based on computed vector similarity metrics for VCi and vector(s) of concepts in defined vicinity of Ci. As disclosed herein, the identification and display of U similar concepts at step 411 may be performed at the QA system 100 or vector processing application 14 by using the similarity calculation engine 15 to compute and compare vector similarity metric values for a vector VCi constructed from the selected concept Ci and for vectors of concepts occurring in close vicinity to the selected concept Ci in the Wikipedia page (e.g., 3 preceding and 3 following it), where U and the vicinity parameters are programmable. In an example embodiment, the constructed vector VCi can be constructed such that the weight of Ci is higher than the weight of its neighbors. Based on the computation results, the top U similar concepts are automatically displayed to the user when the cursor passes over the concept Ci.

As another illustrative example application for identifying related concepts at step 410, the extracted concept vectors may be processed to provide immediate hints identifying concepts of interest at step 412 by displaying a ranked list of concepts linked to the selected concept Ci along with link recommendations for unlinked concept(s) that are similar to Ci based on computed vector similarity metrics. In addition or in the alternative, the ranked list of concepts processed at step 412 may include a recommendation to remove one or more linked concepts that are dissimilar to Ci based on computed vector similarity metrics. As disclosed herein, the identification and display of the ranked list of concepts at step 412 may be performed at the QA system 100 or vector processing application 14 by using the similarity calculation engine 15 to construct a sorted list of the top M concepts according to the cosine distance with respect to the selected concept Ci, where M may be a programmable parameter (e.g., M=40). The generation of the sorted list of concepts at step 412 may include processing to identify a concept Cx on the sorted list that does not have a link to the selected concept Ci and that is more similar to the selected concept Ci than another concept (e.g., Ca) on the sorted list (i.e., Cx has a higher cosine distance to Ci), in which case the display of the ranked list at step 412 may include a link recommendation for the unlinked concept Cx. If there are more than one unlinked concepts (Cx1, Cx2, etc.) that are sufficiently similar to the selected concept Ci, one or more user defined selection parameters may be used to select which unlinked concepts are receive link recommendations. Conversely, the identification and display of the ranked list of concepts at step 412 may include a recommendation to remove a concept Cy on the sorted list that has a link to the selected concept Ci but that is that is less similar to the selected concept Ci than another concept (e.g., Ca) on the sorted list (i.e., Cx has a smaller cosine distance to Ci).

As another illustrative example application for identifying related concepts at step 410, the extracted concept vectors may be processed to provide immediate hints identifying concepts of interest at step 413 by displaying a list of concepts that are not linked to the selected concept Ci. As disclosed herein, the identification and display of unlinked concepts at step 413 may be performed at the QA system 100 or vector processing application 14 by using the similarity calculation engine 15 to identify concepts that are restricted to a specified subject matter area and that are strongly related to each other, though their Wikipedia pages do not point each other. The identification and display of unlinked concepts at step 413 may include concept vector computation processing to identify related, unlinked concepts Ci, Cj such that each is among the top R concepts in terms of the computed vector similarity metrics (e.g., the cosine distance to each other). Based on the computation results, the display of the unlinked concepts at step 413 may include a recommendation to add a link from the page of the selected concept Ci to the page of the similar concept Cj and vice versa. In embodiments where the link recommendation for connecting concepts Ci, Cj is restricted to a specified restricted area, the concept vector computation processing may include (1) identifying the restricted area from a specified collection of concepts with each concept weighted so that the weights sum up to 1, and (2) constructing a corresponding area vector by summing the corresponding vectors, each weighted by the weight of its concept. In selected embodiments for restricting the displayed concepts to a specified subject area, the displayed concepts Ci, Cj may be restricted such that their cosine distance to the computed area vector VA is at least a programmable parameter U (e.g., U=0.75).

As another illustrative example application for identifying related concepts at step 410, the extracted concept vectors may be processed to provide immediate hints identifying concepts of interest at step 414 by displaying a list of concepts that are related to a user-selected concept Ci and/or additional concepts in the user's written content by using computed vector similarity metrics to identify and extract concept vectors on-the-fly from the written content. As disclosed herein, the identification and display of related concepts at step 414 may be performed at the QA system 100 or vector processing application 14 by using the similarity calculation engine 15 to analyze the author's finished content and provide suggestions therefrom. For example, the vector processing application 14 may be configured to monitor, track, or observe content authored by the user up to a current time and to extract therefrom a first concept set A={CA1, CA2, . . . , CAm}. Based on the first concept set A, a second concept set B={CB1, CB2, . . . , CBn} may be identified having concepts that are relevant to the extracted concepts in the first concept set A. For example, the additional concepts in the second concept set B may be identified based on computed cosine distances between concept vectors representing members of concept sets A and B. An example cosine distance computation decision function would be to include a concept Cx from the collection of all candidate concepts into the second concept set B if max{over all possible concepts CAi in the first concept set A} cos(vec(Cx), vec(CAi))>T=0.5 for all CAi in the first concept set A. As a result, the related concept(s) displayed at step 414 include one or more concepts that are highly relevant to at least one of the previously touched concepts contained in the user's written content.

In another example, the related concepts identified and displayed at step 414 may be generated by the user who enters or chooses one or more candidate concepts to serve as seed concepts. Once the seed concepts are created, the identification and display of related concepts at step 414 may proceed to identify key themes among the seed concepts using algorithms for identifying one or more main paths in the knowledge graph connecting the seed concepts, or algorithms for finding trajectories connecting the vectors representing the seed concepts in their embedding space. The identified themes may be used to identify a new set of concepts C={CC1, CC2, . . . , CCn} by interpolating within, extrapolating from, or side-stepping from such main paths or trajectories. The new set of concepts C may be displayed to help the author reinforce, augment, or contradict the relevant theme being presented in the written content, such as by presenting a number of alternative sets of suggestions, and allowing the author to select from them. Once the author makes a selection, the seed concepts may be updated with those from the chosen set to update the analyses and suggestion processing.

In any of the concept identification steps 411-414, the display may include or open a new window or a side bar which shows relevant reference materials containing the set of extracted or recommended concepts. The displayed reference materials could be text passages from a specific corpus (e.g., Wikipedia, legal cases, news reports) that have been previously annotated, indexed, and scored with the same set of concepts. In the window or sidebar, the user/author is provided a choice of one or more candidate corpora to employ, and other ways to organize the presentation of the reference material (e.g., following a time-line).

Once the related concepts identified at step 410 are displayed, the user may actively browsing the displayed concepts and their links. In response to the displayed concept recommendations, the user may provide suggestions of adding new links between concepts or removing existing ones at step 420. As indicated with the feedback line to step 404, the user's suggestions to add or remove links (affirmative outcome to detection step 420) can be applied to change or revise the underlying knowledge graph (e.g., a graph developed from Wikipedia links), which in turn will influence subsequent recommendations, either temporarily or permanently if such changes are saved. At step 421, the process ends if there are no user suggestions detected (negative outcome to detection step 420).

The described process of steps 400-421 uses vector similarity metric values sim(VCi,VCj) to evaluate the similarity of concept pairs Ci, Cj, such as by computing the cosine distance between vectors. However, it will be appreciated that the QA system 100 or vector processing applications 14 may use any desired similarity metric computation to compute a vector distance measure, such as the L_infinity norm (max norm), Euclidean distance, etc.

By now, it will be appreciated that there is disclosed herein a system, method, apparatus, and computer program product for identifying and recommending concepts with an information handling system having a processor and a memory. As disclosed, the system, method, apparatus, and computer program product generate at least a first concept set comprising one or more candidate concepts extracted from one or more content sources. In selected embodiments, the first concept set is generated by extracting a plurality of candidate concepts from a knowledge graph which connects concepts by edges of one or more types. At the system, one or more user concepts contained in written content authored by the user are processed. The information processing may include receiving a user request to produce a set of recommended concepts related to a first selected concept when a cursor passes over the first selected concept, and/or may include detecting one or more concepts contained in written content authored by the user. A vector representation of each user concept and each candidate concept in the first concept set is generated, retrieved, constructed, or otherwise obtained. The vectors are processed by performing a natural language processing (NLP) analysis comparison of the vector representation of each user concept to a vector representation of each candidate concept in the first concept set to determine a similarity measure between each candidate concept and each user concept. In selected embodiments, the NLP analysis includes analyzing a vector similarity function sim(Vi,Vj) between (1) the vector representation Vi of a first selected user concept Ci contained in written content authored by the user and (2) one or more vectors Vj for each candidate concepts in the first concept set. Based on the similarity measure between each candidate concept and each user concept, one or more of the candidate concepts are selected for display as recommended concepts which are related to the one or more concepts contained in the user's written content. In selected embodiments, the candidate concepts are selected by identifying a candidate concept that is similar, but not too similar, to the one or more user concepts in the written content authored by the user. In other embodiments, the candidate concepts are selected by identifying U candidate concepts for display as the recommended concepts, where the U candidate concepts are within a specified vicinity of the one or more user concepts contained in written content authored by the user which have the highest similarity measures, where U is a user specified concept identification parameter. In other embodiments, the candidate concepts are selected by constructing a ranked list of M candidate concepts sorted by similarity measure for display as the recommended concepts, where M is a user specified concept identification parameter. When constructing the ranked list of M candidate concepts, there may be generated a link addition recommendation to a first concept in the ranked list which is not linked to the first selected concept Ci and which meets a predetermined test for similarity to the first selected concept Ci. In addition or in the alternative, construction of the ranked list may include generating a link deletion recommendation to a first concept in the ranked list which is linked to the first selected concept Ci and which meets a predetermined test for dissimilarity to the first selected concept Ci. In other embodiments, the candidate concepts are selected by identifying at least one candidate concept which is not linked by underlying documents to the first selected concept Ci. In other embodiments, the candidate concepts are selected by identifying one or more of the candidate concepts restricted to a specific area of relatedness with respect to the first selected concept Ci.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for identifying concepts, the method comprising:

generating, by the system, at least a first concept set comprising one or more candidate concepts extracted from one or more content sources;

processing, by the system, one or more user concepts contained in written content authored by the user;

generating or retrieving, by the system, a vector representation of each user concept and each candidate concept in the first concept set;

performing, by the system, a natural language processing (NLP) analysis comparison of the vector representation of each user concept to a vector representation of each candidate concept in the first concept set to determine a similarity measure between each candidate concept and each user concept by analyzing a vector similarity function sim(Vi,Vj) between (1) a vector representation Vi of a first selected user concept Ci contained in written content authored by the user and (2) one or more vectors Vj for each candidate concept in the first concept set, wherein i and j are positive integer values; and selecting, by the system, one or more of the candidate concepts for display as recommended concepts which are related to the one or more user concepts contained in written content authored by the user based on the similarity measure between each candidate concept and each user concept and which are restricted to a specific area of relatedness with respect to the first selected concept Ci, where the one or more candidate concepts are selected by constructing a ranked list of M candidate concepts sorted by similarity measure for display as the recommended concepts, where M is a user specified concept identification parameter that is a positive integer value.

2. The method of claim 1, wherein selecting one or more of the candidate concepts for display comprises selecting a candidate concept that is similar, but not too similar, to the one or more user concepts in the written content authored by the user.

3. The method of claim 1, wherein processing the one or more user concepts comprises receiving, by the system, a user request to produce a set of recommended concepts related to a first selected concept when a cursor passes over the first selected concept.

4. The method of claim 1, wherein constructing the ranked list of M candidate concepts comprises generating a link addition recommendation to a first concept in the ranked list which is not linked to the first selected concept Ci and which meets a predetermined test for similarity to the first selected concept Ci.

5. The method of claim 1, wherein constructing the ranked list of M candidate concepts comprises generating a link deletion recommendation to a first concept in the ranked list which is linked to the first selected concept Ci and which meets a predetermined test for dissimilarity to the first selected concept Ci.

6. The method of claim 1, wherein selecting one or more of the candidate concepts comprises selecting, by the system, at least one candidate concept which is not linked by underlying documents to the first selected concept Ci.

7. An information handling system comprising:
one or more processors;
a memory coupled to at least one of the processors;
a set of instructions stored in the memory and executed by at least one of the processors to identify concepts, wherein the set of instructions are executable to perform actions of:
generating, by the system, at least a first concept set comprising one or more candidate concepts extracted from one or more content sources;
processing, by the system, one or more user concepts contained in written content authored by the user;
generating or retrieving, by the system, a vector representation of each user concept and each candidate concept in the first concept set;
performing, by the system, a natural language processing (NLP) analysis comparison of the vector representation of each user concept to a vector representation of each candidate concept in the first concept set to determine a similarity measure between each candidate concept and each user concept by analyzing a vector similarity function sim(Vi,Vj) between (1) a vector representation Vi of a first selected user concept Ci contained in written content authored by the user and (2) one or more vectors Vj for each candidate concept in the first concept set, wherein i and j are positive integer values; and
selecting, by the system, one or more of the candidate concepts for display as recommended concepts which are related to the one or more user concepts contained in written content authored by the user based on the similarity measure between each candidate concept and each user concept and which are restricted to a specific area of relatedness with respect to the first selected concept Ci, where the one or more candidate concepts are selected by constructing a ranked list of M candidate concepts sorted by similarity measure for display as the recommended concepts, where M is a user specified concept identification parameter that is a positive integer value.

8. The information handling system of claim 7, wherein the set of instructions are executable to select one or more of the candidate concepts for display by selecting a candidate concept that is similar, but not too similar, to the one or more user concepts in the written content authored by the user.

9. The information handling system of claim 7, wherein the set of instructions are executable to process user information by receiving a user request to produce a set of recommended concepts related to a first selected concept when a cursor passes over the first selected concept.

10. The information handling system of claim 7, wherein the set of instructions are executable to construct the ranked list of M candidate concepts by generating a link addition recommendation to a first concept in the ranked list which is not linked to the first selected concept Ci and which meets a predetermined test for similarity to the first selected concept Ci.

11. The information handling system of claim 7, wherein the set of instructions are executable to construct the ranked list of M candidate concepts by generating a link deletion recommendation to a first concept in the ranked list which is linked to the first selected concept Ci and which meets a predetermined test for dissimilarity to the first selected concept Ci.

12. The information handling system of claim 7, wherein the set of instructions are executable to select one or more of the candidate concepts by selecting at least one candidate concept which is not linked by underlying documents to the first selected concept Ci.

13. A computer program product stored in a computer readable storage medium, comprising computer instructions that, when executed by an information handling system, causes the system to identify concepts by performing actions comprising:
generating, by the system, at least a first concept set comprising one or more candidate concepts extracted from one or more content sources;
processing, by the system, one or more user concepts contained in written content authored by the user;
generating or retrieving, by the system, a vector representation of each user concept and each candidate concept in the first concept set;
performing, by the system, a natural language processing (NLP) analysis comparison of the vector representation of each user concept to a vector representation of each candidate concept in the first concept set to determine a similarity measure between to each candidate concept and each user concept by analyzing a vector similarity function sim(Vi,Vj) between (1) a vector representation Vi of a first selected user concept Ci contained in written content authored by the user and (2) one or more vectors Vj for each candidate concept in the first concept set, wherein i and j are positive integer values; and
selecting, by the system, one or more of the candidate concepts for display as recommended concepts which are related to the one or more concepts contained in written content authored by the user based on the similarity measure between each candidate concept and each user concept and which are restricted to a specific area of relatedness with respect to the first selected concept $C_i$, where the one or more candidate concepts are selected by constructing a ranked list of M candidate concepts sorted by similarity measure for display as the recommended concepts, where M is a user specified concept identification parameter that is a positive integer value.

14. The computer program product of claim 13, wherein constructing the ranked list of M candidate concepts comprises generating a link addition recommendation to a first concept in the ranked list which is not linked to the first selected concept $C_i$ and which meets a predetermined test for similarity to the first selected concept $C_i$.

* * * * *